(12) United States Patent
McClung (10) Patent No.: US 11,466,712 B2
(45) Date of Patent: Oct. 11, 2022

(54) CLAMPING ASSEMBLY

(71) Applicant: David L. McClung, Des Moines, IA (US)

(72) Inventor: David L. McClung, Des Moines, IA (US)

(*) Notice: Subject to any disclaimer, the term of this patent is extended or adjusted under 35 U.S.C. 154(b) by 116 days.

(21) Appl. No.: 16/900,347

(22) Filed: Jun. 12, 2020

(65) Prior Publication Data

US 2020/0307754 A1 Oct. 1, 2020

Related U.S. Application Data

(63) Continuation of application No. 16/374,204, filed on Apr. 3, 2019, now abandoned, which is a continuation-in-part of application No. 16/181,654, filed on Nov. 6, 2018, now abandoned, which is a continuation-in-part of application No. 15/812,215, filed on Nov. 14, 2017, now abandoned.

(51) Int. Cl.
| | |
|---|---|
| *F16B 2/18* | (2006.01) |
| *B25B 5/12* | (2006.01) |
| *B63H 25/38* | (2006.01) |
| *B63B 32/66* | (2020.01) |

(52) U.S. Cl.
CPC ............ *F16B 2/185* (2013.01); *B25B 5/127* (2013.01); *B63B 32/66* (2020.02); *B63H 25/382* (2013.01); *Y10T 403/595* (2015.01); *Y10T 403/7071* (2015.01)

(58) Field of Classification Search
CPC ....... B63B 35/793; B63B 32/66; B63H 25/38; B63H 25/382; B63H 2025/384; B63H 2025/386; F16B 2/18; F16B 2/185; F16B 5/0084; F16B 5/0088; F16B 5/0621; F16B 5/0628; F16B 5/0664; F16B 12/2009; F16B 12/2027; F16B 12/32; F16B 2200/40; F16B 2200/403; F16B 2200/406; F16B 2200/509; F16B 2005/0678; Y10T 403/32532; Y10T 403/591; Y10T 403/595; Y10T 403/648; Y10T 403/7064; Y10T 403/7066; Y10T 403/7071
USPC .... 403/110, 322.1, 322.4, 338, 374.1, 374.2, 403/374.5, DIG. 9
See application file for complete search history.

(56) References Cited

U.S. PATENT DOCUMENTS

| | | | | |
|---|---|---|---|---|
| 3,432,197 | A * | 3/1969 | Graves | F16B 2/185 403/110 |
| 4,044,416 | A * | 8/1977 | Brewer | B63B 32/66 441/79 |
| 4,846,745 | A * | 7/1989 | Lobe | B63B 32/66 441/79 |
| 4,850,917 | A * | 7/1989 | Wilson | B63B 32/66 441/79 |

(Continued)

FOREIGN PATENT DOCUMENTS

EP 1517050 A1 * 3/2005 .............. F16B 2/18

*Primary Examiner* — Josh Skroupa
(74) *Attorney, Agent, or Firm* — Zarley Law Firm, P.L.C.

(57) ABSTRACT

A clamp assembly for connecting a rudder to an aquatic device having a body with a first end, a second end, a top and a bottom. A clamp having a screw connected to a pivot pin disposed within a clamp head is removably connected to the top of the body for selectively applying a clamping force on the body. The clamp handle in some bodies tapering to an end to allow placement within a retaining slot of a fin box.

11 Claims, 11 Drawing Sheets

(56) References Cited

U.S. PATENT DOCUMENTS

| | | | | |
|---|---|---|---|---|
| 4,964,826 | A * | 10/1990 | Lobe | B63B 32/66 |
| | | | | 441/79 |
| 5,020,195 | A * | 6/1991 | LeVahn | A61B 17/02 |
| | | | | 24/514 |
| 5,215,488 | A * | 6/1993 | Bailey | B63B 32/66 |
| | | | | 403/325 |
| 6,277,069 | B1 * | 8/2001 | Gray | A61B 17/02 |
| | | | | 403/391 |
| 6,474,900 | B2 * | 11/2002 | Feng | F16B 2/18 |
| | | | | 403/322.4 |
| 7,896,569 | B2 * | 3/2011 | Katzenstein | A61G 13/12 |
| | | | | 403/322.4 |
| 8,608,118 | B2 * | 12/2013 | Lai | F16B 7/1454 |
| | | | | 403/322.4 |
| 8,776,810 | B2 * | 7/2014 | Lah | A45B 9/00 |
| | | | | 403/374.5 |
| 9,337,524 | B2 * | 5/2016 | Yang | F16B 5/0088 |
| 9,688,365 | B2 * | 6/2017 | Norrie | B63B 32/66 |
| 9,908,596 | B2 * | 3/2018 | Watson | B63B 32/66 |
| 9,933,001 | B2 * | 4/2018 | Gardiner | F16B 7/1454 |
| 10,051,930 | B2 * | 8/2018 | Heim | A63C 11/221 |
| 10,117,382 | B2 * | 11/2018 | Li | A01D 34/84 |
| 10,213,719 | B2 * | 2/2019 | Knox, II | F16B 2/18 |
| 10,226,241 | B2 * | 3/2019 | Farley | F16B 2/18 |
| 2010/0308190 | A1 * | 12/2010 | Tkocz | B64D 11/04 |
| | | | | 248/222.14 |
| 2014/0308071 | A1 * | 10/2014 | Darley | B62K 19/36 |
| | | | | 403/322.4 |
| 2019/0111733 | A1 * | 4/2019 | Lai | B60B 27/026 |

* cited by examiner

CLAMPING ASSEMBLY

CROSS-REFERENCE

This application is a continuation of pending application Ser. No. 16/374,204, filed Apr. 3, 2019, which is a continuation-in-part of pending application Ser. No. 16/181,654, filed Nov. 6, 2018, which is a continuation-in-part of pending application Ser. No. 15/812,215, filed Nov. 14, 2017, the contents of this application is hereby incorporated by reference in its entirety.

BACKGROUND OF THE INVENTION

The present invention is directed to a clamping assembly, and more particularly, a clamping assembly for connecting a rudder to an aquatic device.

Rudders for use with aquatic devices such as paddle boards, surf boards, and the like are well-known in the art. On occasion, rudders break and/or need to be replaced or they need to be removed for transportation and storage. Presently this process is difficult requiring the use of a number of small pieces that need to be aligned that can easily become lost in cold, wet, and sandy conditions. Not only is the process difficult and time consuming, it is also frustrating.

Another issue present in the art is allowing for the fine-tune adjustment of the rudder's position on the aquatic device. Currently, there is no simple and straightforward way to accomplish such adjustments. As a result, the rudder is maintained in a constant position that may not be suitable for all water and wave conditions.

Some improvements in the art use a thumb screw or a screw to hold the rudder in place. Although this limits the number of parts, the use of such devices make it likely that the positioning of the rudder will change due to the loosening of the screw or thumbscrew. Also, the need to tighten such connections firmly can result in difficulties in removing the screw or thumbscrew-especially in instances where assistive tools are not available.

One advancement is found in the incorporated applications, application Ser. Nos. 15/812,215 and 16/181,654, invented by McClung. These inventions provide for a clamping assembly that facilitates adjustment and connection of a rudder in a straightforward and simple way.

Despite these advancements, problems still remain. For instance, the McClung devices use a threaded screw that connects to a body, which in some embodiments is plastic. As a result of the use of plastic, the threaded screw strips the plastic if the threaded screw is screwed too far into the bottom and then excessive force is applied to the clamp handle.

Some riders or surfers also take issue with the size of the body used in the clamp assemblies as it does not always permit the entire length of the retaining slot in the fin box to be utilized. As a result, rudders cannot be positioned as far to either side of the fin box as some would like.

Further, the use of a clamp can increase drag in the water due to the size and profile of the clamp handle that extends substantially, if not entirely, outside of and away.

Therefore, a need exists in the art for an assembly that addresses these deficiencies.

An objective of the present invention is to provide a clamp assembly that provides a quick and easy connection for a rudder.

Another objective of the present invention is to provide a clamp assembly where parts are difficult to lose.

Yet another objective of the present invention is to provide a clamp assembly that reduces drag caused by a handle.

Another objective of the present invention is to provide a clamp assembly that limits or eliminates stripping occurring during clamping.

Yet another objective of the present invention is to provide a clamp assembly that permits maximized lateral movement along a retaining slot of a fin box.

These and other objectives will be apparent to those skilled in the art based upon the following written description, claims, and drawings.

SUMMARY OF THE INVENTION

A clamp assembly for connecting a rudder to an aquatic device includes a body having a top, a bottom, a first end, and a second end. Extending inwardly from the first end is a slot which forms a finger along the bottom of the body.

Connected to the top of the body, above the slot, is a clamp having a clamp head and a clamp handle. Disposed within the clamp head is a pivot pin. Transversely connected to the pivot pin, and extending outwardly from the pivot pin and clamp head, is a screw. The screw extends through the body and slot.

The clamp assembly is received in a fin box through a retaining slot and thereafter slides along an internal portion of the retaining slot to adjustably position the connection of the rudder. The clamp assembly of the present invention is formed in some arrangements to work with existing fin boxes.

In some embodiments of the clamp assembly, the bottom of the body has a cutout that receives a nut. The nut connects to the screw, thereby connecting the screw to the clamp at one end and the nut to the other. This allows the clamp to be tightened to provide close tolerances during engagement. At the same time, the nut, which is metal in some embodiments, reduces or eliminates stripping. If the screw strips the nut, the nut can simply be replaced without need of replacing the body.

The cutout is configured to provide close tolerances with the nut. In one embodiment, the nut has a square shape, which prevents rotation of the screw, the nut, and the clamp, which reduces drag and the potential for the rudder to become loose.

In some embodiments of the clamp assembly, the body has only a top portion with a protuberance extending from the bottom of the top portion. The top portion has a recess for the operation of the clamp and is sized and shaped to slide along a top surface of the fin box. The protuberance is sized and shaped to be received in the retaining slot of the fin box. In this way, the body can be moved along the entire length of the fin box and allows positioning of the rudder closer to the ends of the fin box because the body is not positioned within the fin box.

In some embodiments, the screw extends through a socket and an O-ring into a threaded bore. The threaded bore extends through the top of the body to the slot. The socket is formed to moveably receive the clamp head. Through the rotation and pivoting of the clamp, the screw applies a clamping force within the slot.

In other arrangements of the clamp assembly, the clamp handle tapers away from the clamp head to an end. In this configuration, the clamp handle is at least partially received within the fin box, thereby reducing the profile of the clamp and limiting drag.

DETAILED DESCRIPTION OF THE PREFERRED EMBODIMENT

Referring to the Figures, a clamp assembly 10 for securing a rudder 12 to an aquatic device 14 has a body 16 having a first end 18, a second end 20, a top 22 and a bottom 24. A slot 26 that extends from the first end 18 into the body 16 has a first section 28 and a second section 30. The height of the first section 28 of the slot 26 is greater than the height of the second section 30 which creates weakness within the body 16 for clamping. The slot 26 forms a bottom finger 32 between the slot 26 and the bottom 24 of the body 16. Positioned along the finger 32 is at least one and preferably two pins 34 that extend outwardly and transversely to the body 16. Also, the tip 36 of the finger 32 at the first end 18 is curved or chamfered.

The top 22 has a first section 38 and a second raised section 40 that are separated by a shoulder 42. Preferably, the raised section 40 corresponds with the second section 30 of the slot 26. A threaded or unthreaded bore 44 extends through the raised section 40 from the top 22 to the slot 26. Vertically aligned with the bore 44 is a second threaded or unthreaded bore 46 that extends from slot 26 through finger 32.

Attached to the body 16 is a clamp 48. The clamp 48 has a threaded screw or a post 50 that extends through an O-ring 52 and a socket 54. An end 53 of the screw 50 is connected to a pivot pin 55 in a spherical clamp head 56 that is moveably received within the socket 54 and terminates in a clamp handle 58. Preferably, the clamp head 56 has more than one and preferably two angles 60 and 62 that require greater force to rotate the head 56 within the socket 54 making the release of the clamp 48 from the body 16 more secure. In other embodiments, the screw 50 is a post that maintains a static position thereby eliminating the need to adjust the position of the spherical clamp head 56, which in turn provides consistent operation of the clamp 48 but eliminates the ability to fine-tune the clamping pressure.

In an alternative arrangement, the socket 54 is not present. Instead, the second raised section 40 has a recess 41 that is positioned rearwardly on the second raised portion 40 such that the recess 41 is closer to the shoulder 42 than an opposing side 43 of the second raised portion 40. By positioning the recess 41 closer to the shoulder 42, fine-tuned adjustment of the rudder 12 is provided as detailed further herein. Additionally, the absence of the socket 54 reduces the likelihood that a user of the clamp assembly 10 will attempt to unscrew the clamp 48 to align the socket 54 that can rotate when not clamped down. Still further, the absence of the socket 54 reduces drag against water during operation while also reducing the overall size of the clamp assembly 10.

In operation, the body 16 is inserted into a retaining slot 64 of a fin box 65 that is received on a bottom surface 66 of the aquatic device 14. The fin box 65 in some embodiments has an exterior surface 71 that is entirely ribbed or at least partially ribbed. In one particular arrangement, the exterior surface 71 along the length of the fin box 65 at a top edge 73 and a bottom edge 75 is the only ribbed portion.

The aquatic device 14 is of any type such as a surf board, paddle board, kayak, or the like. The retaining slot 64 has an elongated portion 68 that extends along the length of the device 14, a shorter portion 70 transverse to the elongated portion 68, and an internal portion 72 that runs parallel to and outside of the elongated portion 68.

In one embodiment, the short portion 70 is elongated in the direction of the elongated portion 68, which facilitates the insertion of the body 16 and rudder 12 as detailed further herein. In one embodiment, the short portion 70 has a rectangular shape such that a length of the short portion 70 is greater than a width of the short portion 70. In one particular embodiment, the short portion 70 has a length of 0.75 inches or approximately 0.75 inches.

The body 16 is inserted into the retaining slot 64 by aligning and inserting the pins 34 into the transverse portion 70 and once inserted moving the pins 34 along internal portion 72 and the body 16 along the elongated portion 68 to a forward end 74 of the retaining slot 64.

The rudder 12 is then inserted into the retaining slot 64. More specifically, the rudder 12 has a fin 76 that is connected to a support member 78 having a first end 80 and a second end 82. Adjacent the second end 82 is a pin 84 that extends outwardly and transversely to the support member 78. The pin 84 is aligned with and inserted into portion 70 of the retaining slot 64 and then slid to the forward end 74 of the retaining slot 64 within the internal portion 72 of slot 64. The first end 80 of the support member 78 has a section 88 that is raised in relation to the rest of the support member 78 such that upon insertion into the fin box 65, the section 88 forms a gap 89 between a bottom 91 of the fin box 65. In this way, the gap 89 permits the finger 32 to be received at least partially between the section 88 and the bottom 91 of the fin box 65. Likewise, the section 88 is configured to be received within the first section 28 of the slot 26 to be retained by the clamp 48.

The fin 76 of the rudder 12, in some embodiments, has an arc or crescent shape which extends downwardly in relation to the bottom 91 of the fin box 65. The support member 78 in some embodiments is arranged such that the fin 76 extends towards the section 88 of the support member 78 such that during use, the fin 76 reduces friction and drag on the clamp assembly 10.

Once the rudder 12 is received within the retaining slot 64, the clamp assembly 10 is slid rearwardly within slot 64 to receive the raised section 88 of the support member 78 within slot 26 of the body 16. The curved or chamfered tip 36 of finger 32 helps to guide the raised section 88 into the slot 26. The clamp head 56 is then rotated clockwise using the clamp handle 58. The rotation of the head 56 causes the screw 50 to move downwardly through the bore 44. As the screw 50 moves downward the socket 54 and the head 56 are drawn downwardly against raised section 40 of the body 16 and the screw 50 engages the raised section 88 to apply a clamping force. The handle 58 is then rotated downwardly against the top 22 of the body 16 to apply further clamping force.

In embodiments without the socket 54, a similar operation occurs. Namely, the clamp head 56 is positioned to allow clamping, i.e., downward movement of the clamp handle 58, using the clamp handle 58. The clamp handle 58 is rotated or otherwise transitioned downwardly towards the top 22 of the body 16 and particularly upon the location of the recess 41, which reduces the height of the first section 28 and increases the clamping force applied to the support member 78 of the rudder 12. The cam-shape of the clamp head 56 in some arrangements facilitates the application of additional clamping force. The clamp head 56, as seen in the illustrative embodiment, is sized and shaped to be received and match the shape of the recess 41 when the clamp handle 58 is moved downward towards the body 16.

For a more secure connection, the raised section 88 of the rudder 12 has a threaded or unthreaded bore 90 that is vertically aligned with bores 44 and 46 and receives screw 50.

In an alternative embodiment of the present invention, the body 16 has a length that extends between the first end 18 to the second end 20 that is 2.125 inches or approximately 2.125 inches. The fin box 65 has a length that extends between a first end 67 and a second end 69 of the fin box 65 that is 10.5 inches or approximately 10.5 inches in length and the retaining slot 64 has a similarly oriented length of 10.125 inches or approximately 10.125 inches. In this configuration, the body 16 is capable of greater adjustment along the retaining slot 64 of the fin box 65 than is possible with a longer body 16. This in turn provides for fine-tuned adjustment of the rudder 12 along the length of the retaining slot 64, which is beneficial due to the need to have the rudder 12 in different positions depending on the water and wave conditions that are to be encountered. Furthermore, when the recess 41 of the clamp 48 is positioned closer to the shoulder 42 additional space is provided to position the rudder 12 that would otherwise encounter the screw 50 of the clamp 48 at a shorter distance along the retaining slot 64.

In order to shorten the body 16, the slot 26 has a total length of 2.25 inches or approximately 2.25 inches extending from the front end 18 extending back towards the second end 20. The second section 30 of the slot 26 has a length of 0.5 inches or approximately 0.5 inches, which is necessary to permit clamping while still reducing the length of the body 16. In one embodiment, the slot 26 extends such that there is 0.5 inches or approximately 0.5 inches between the slot 26 and the second end 20 of the body 16.

When the length of the body 16 is reduced, the pins 34 are positioned such that one pin 34 is adjacent the first end 18 and another pin 34 is positioned adjacent the second end 20. In a particular embodiment, the pins 34 are within 0.125 inches or approximately 0.125 inches of the respective ends 18, 20 and the bottom 24 of the body 16. The positioning of the pins 34 along with the shortened size of the body 16 in this arrangement facilitates insertion into the fin box 65 as the body 16 and the pins 34 are more easily manipulated into position.

In some embodiments, the width of the body 16 save for the raised section 40 has a width that is 0.15 inches or less when compared to the width of the retaining slot 64. These close tolerances facilitate the insertion and assembly of the body 16 with the fin box 65.

Figure 1:
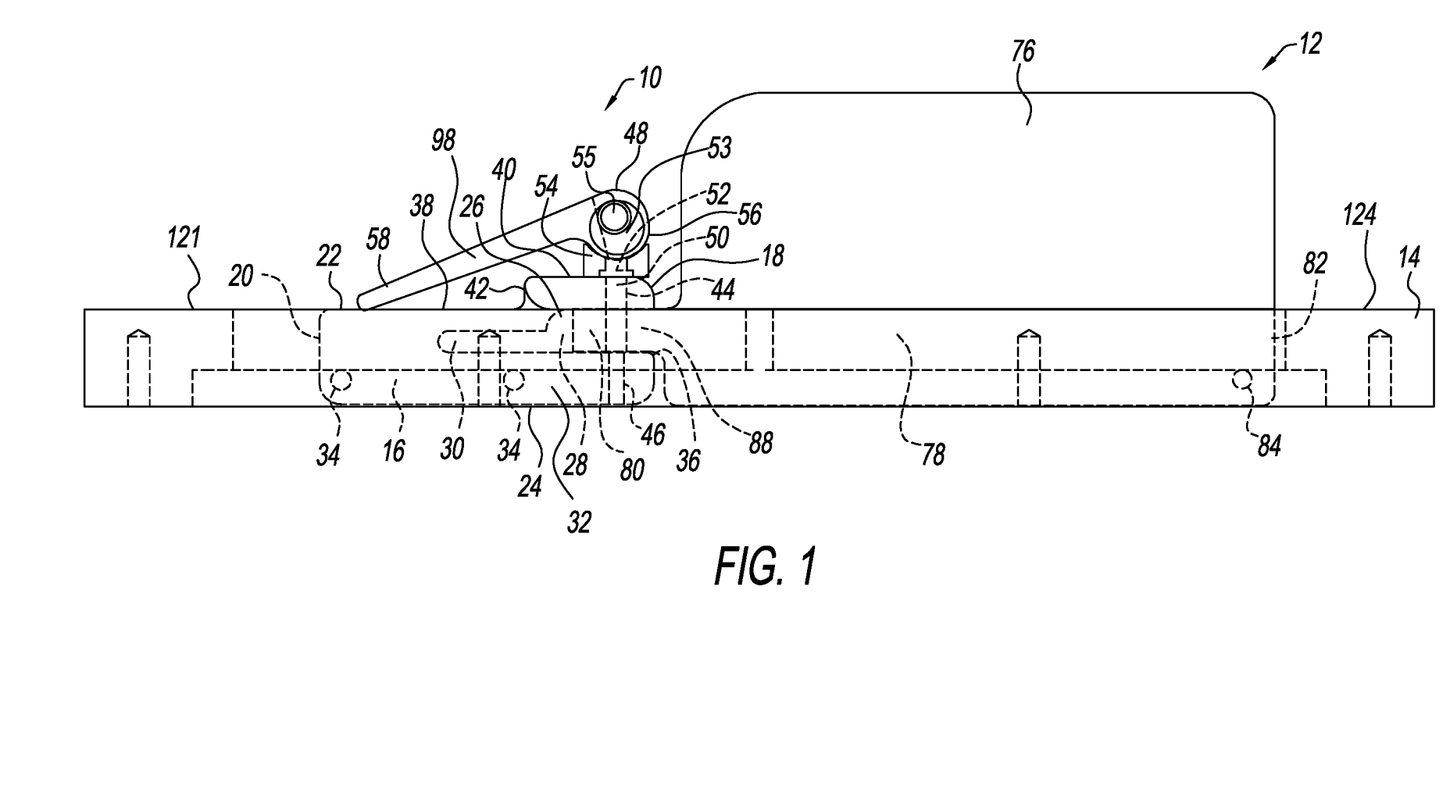
FIG. 1 is a side view of a clamp assembly connecting a rudder to an aquatic device.
Figure 2:
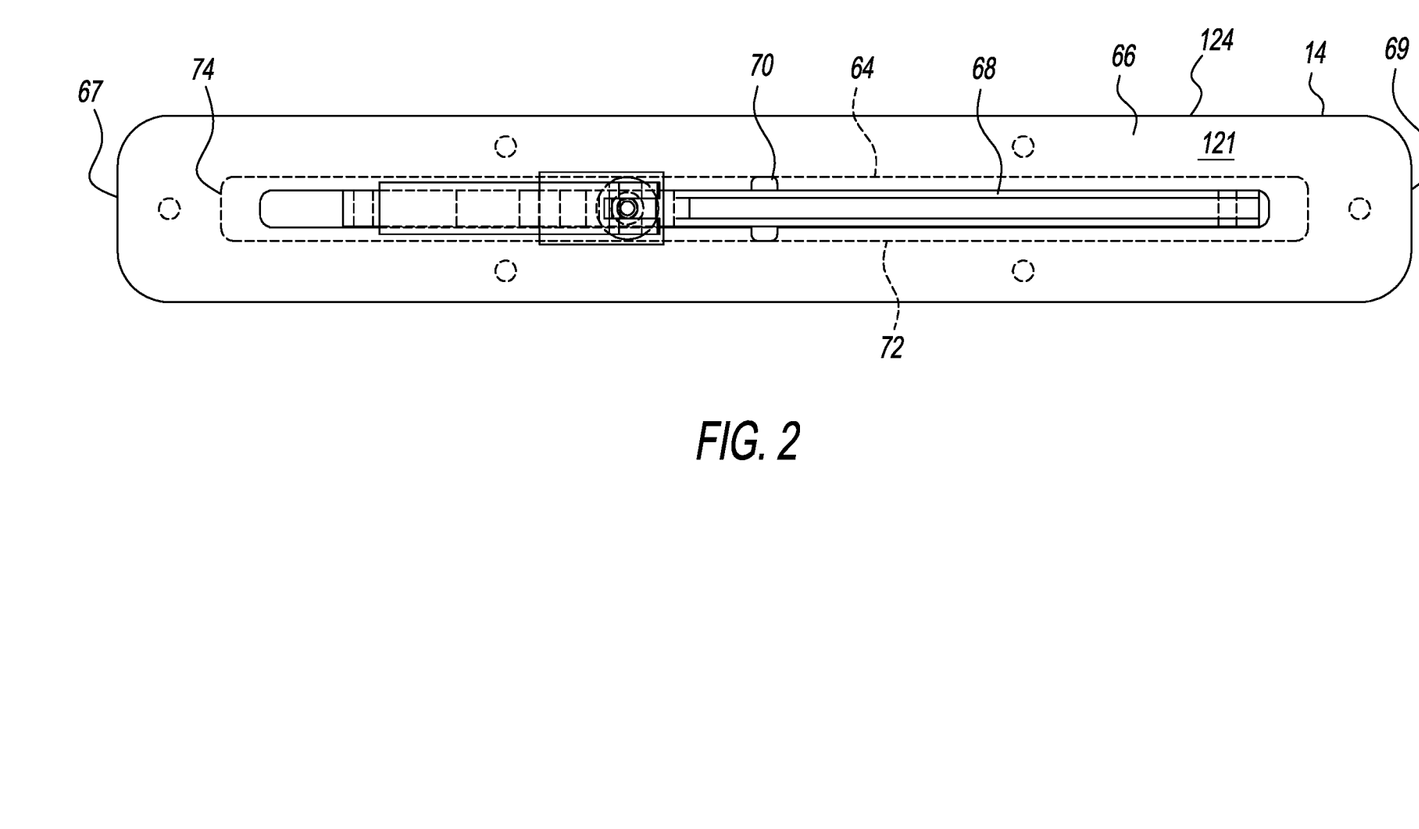
FIG. 2 is a bottom plan view of a clamp assembly connecting a rudder to an aquatic device.
Figure 3:
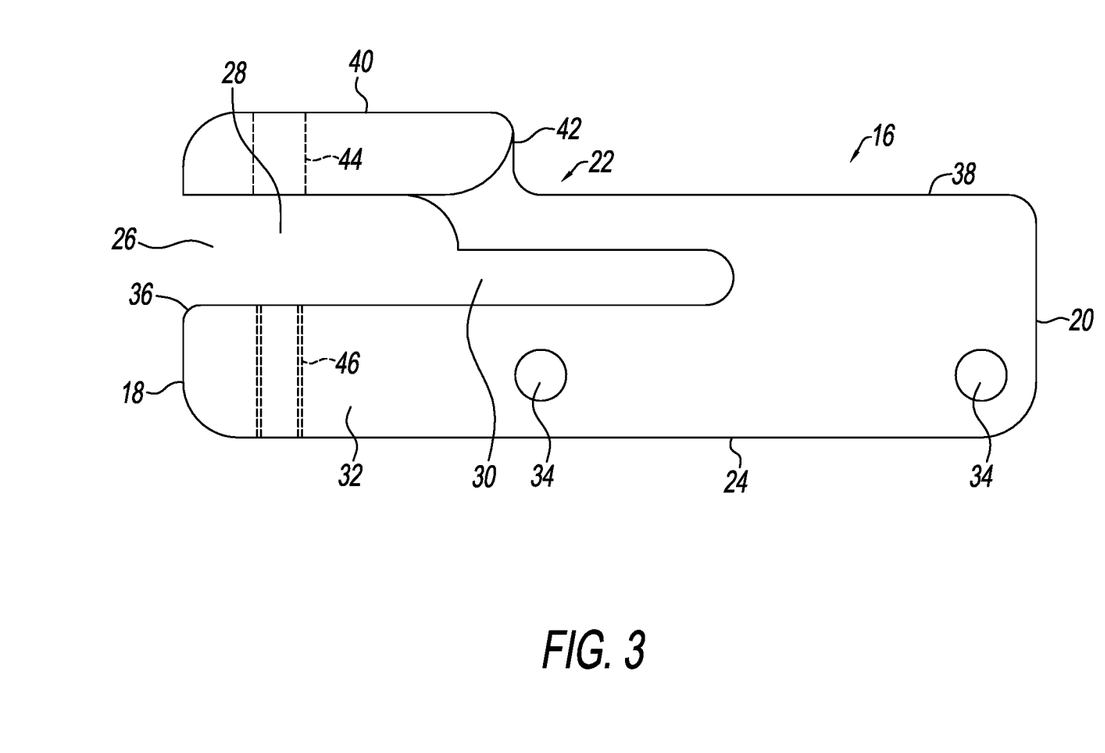
FIG. 3 is a side view of a body of a clamp assembly.
Figure 4:
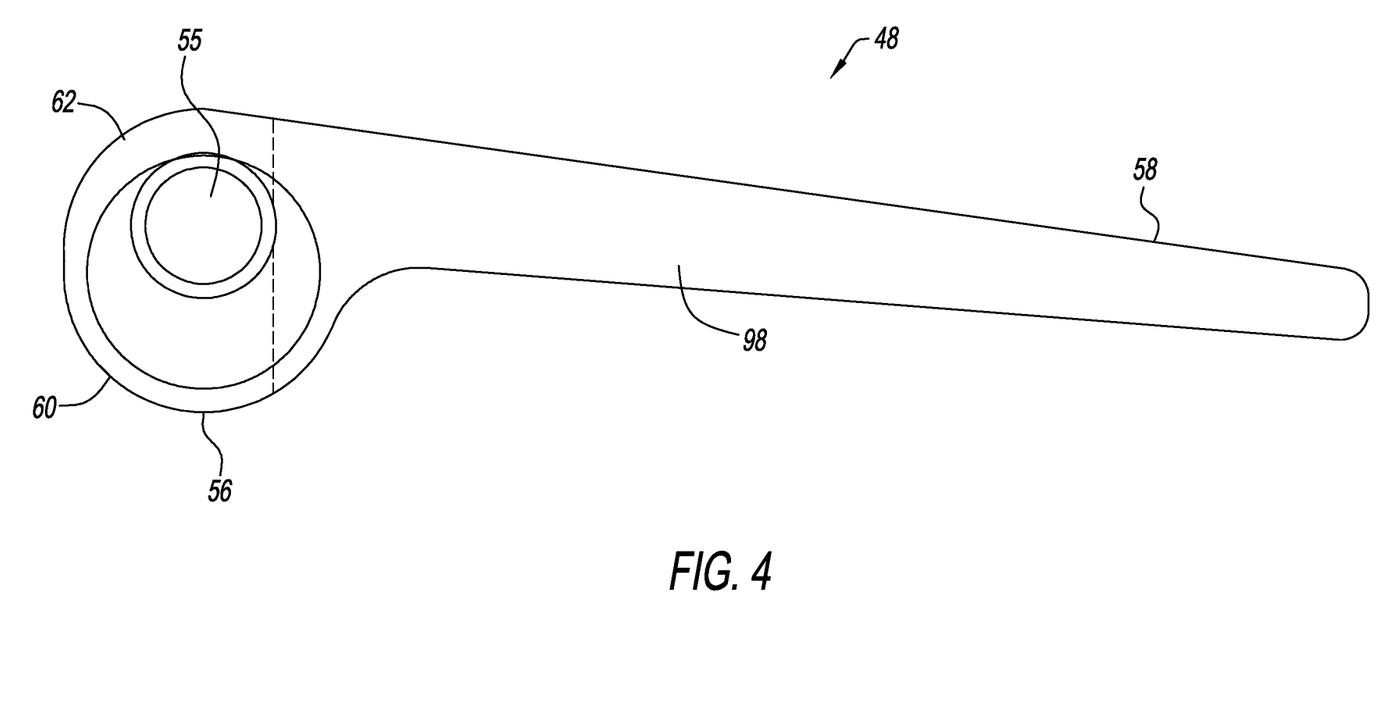
FIG. 4 is a side view of a clamp of a clamp assembly.
Figure 5:
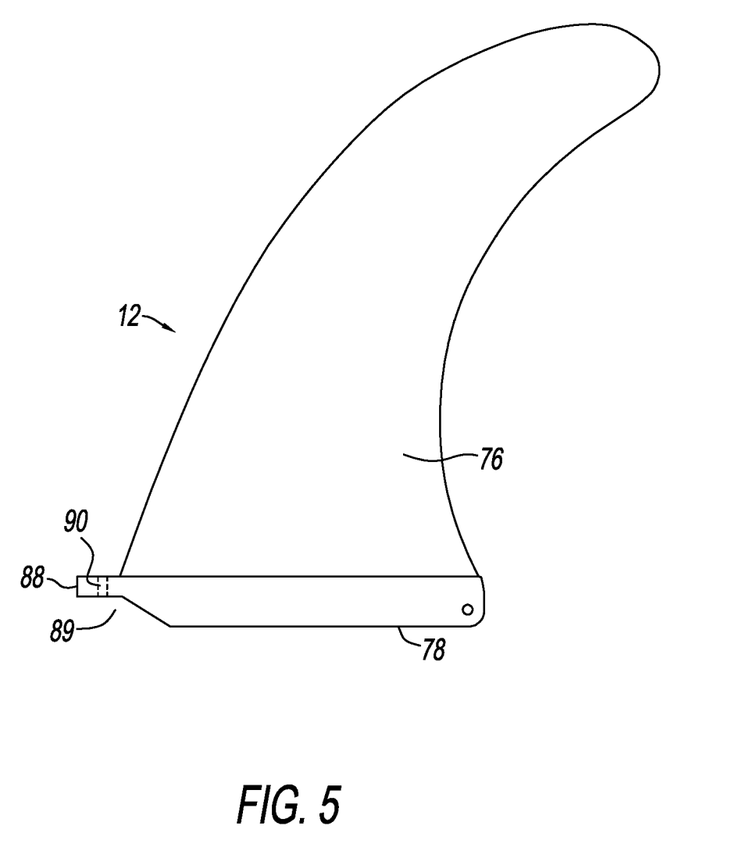
FIG. 5 is a side view of a rudder according to an aspect of the disclosure.
Figure 6:
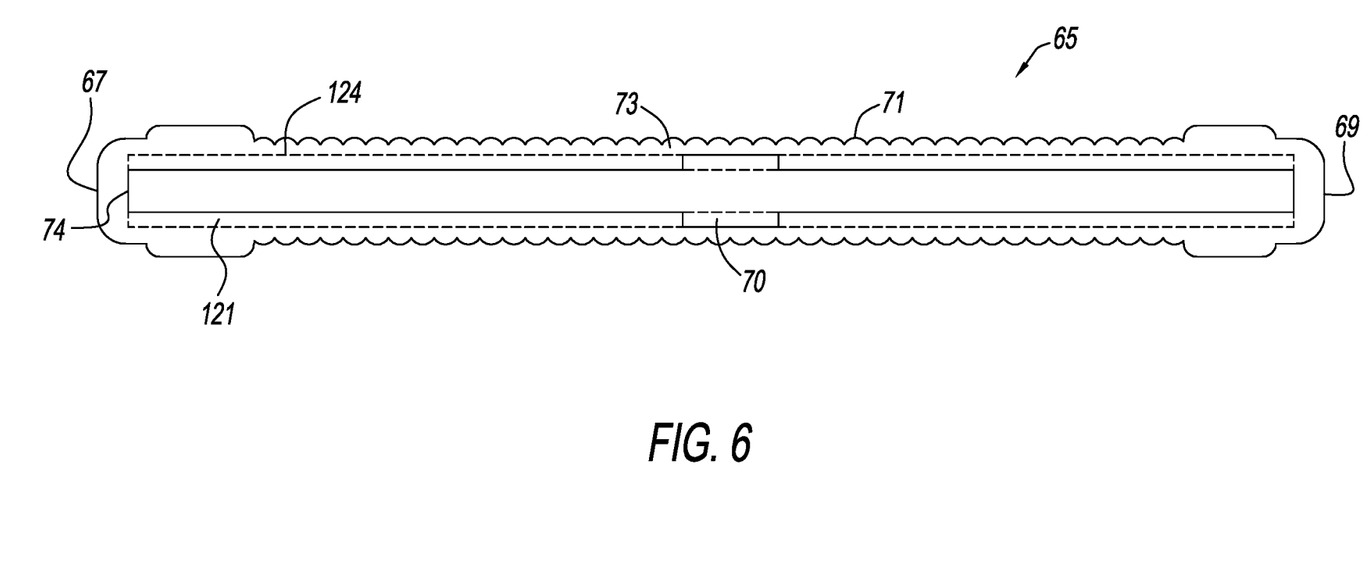
FIG. 6 is a side view of a fin box.
Figure 7:
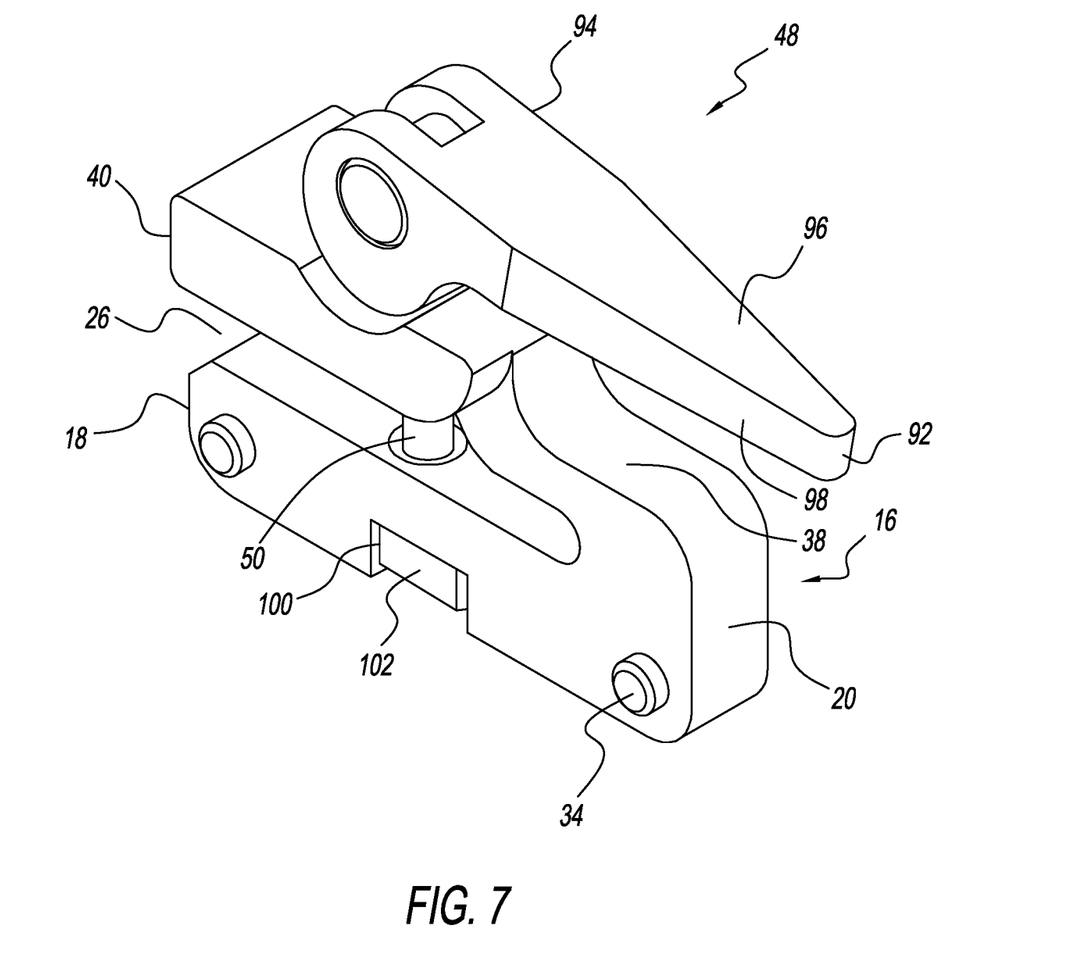
FIG. 7 is a perspective view of a clamp assembly.
Figure 8:
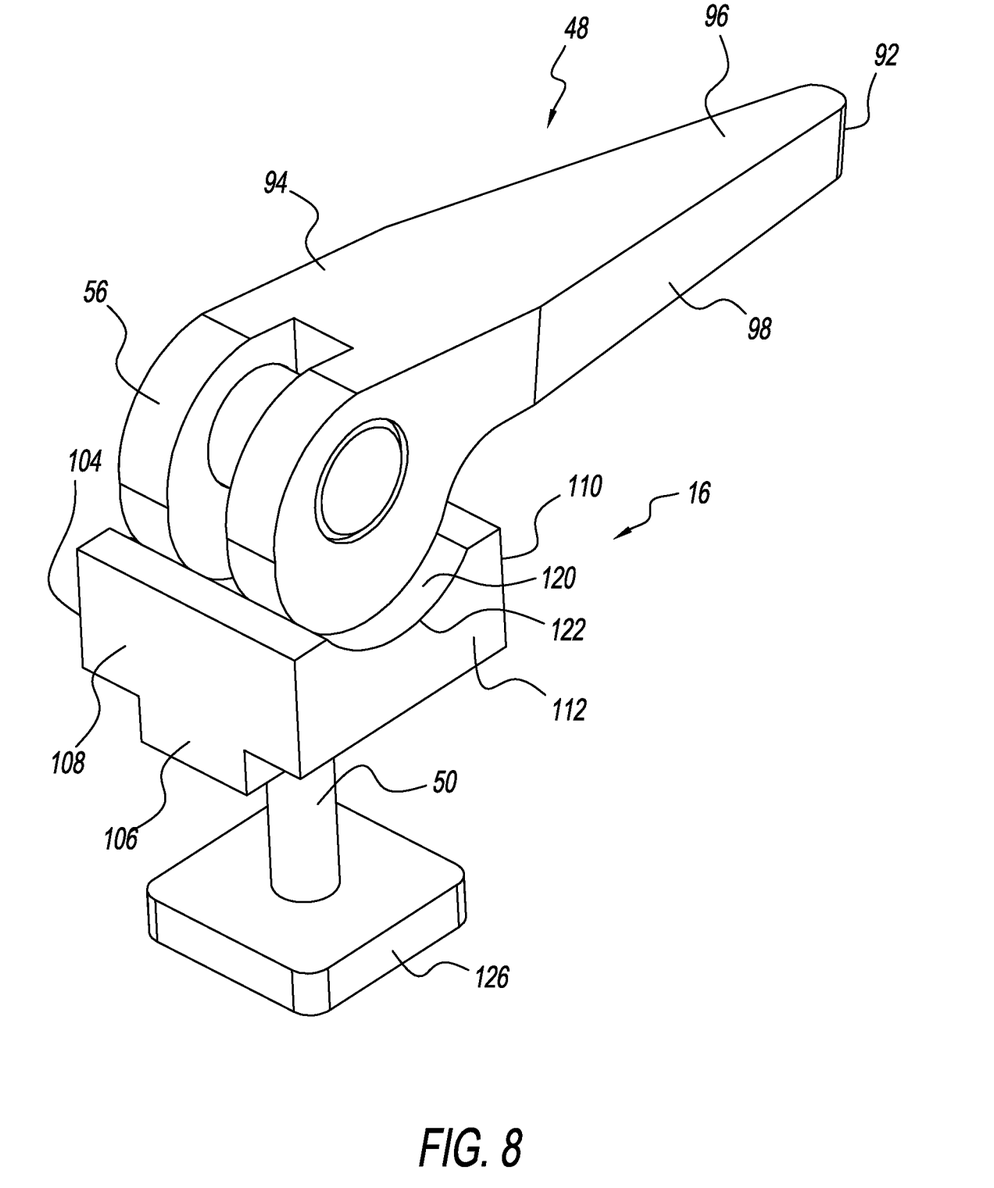
FIG. 8 is a perspective view of a clamp assembly.

In some arrangements of the clamp assembly 10, the clamp handle 58 of the clamp 48 is tapered. As seen in FIGS. 7 and 8, the clamp handle 58 extends away from the clamp head 56 to an end 92. In some embodiments, the end 92 is a point and in others the end is a rounded point. A parallel portion 94 of the clamp handle 58 connects to and extends away from the clamp head 56 towards the end 92. From the parallel portion 94, the clamp handle 58 transitions into a tapered portion 96 which extends to the end 92. The tapered portion 96 has a pair of sides 98 that converge towards each other as the tapered portion 96 extends away from the parallel portion 94. In this way, the parallel portion 94 of the clamp handle 58 is positioned between the clamp head 56 and the tapered portion 96 and the tapered portion 96 is positioned between the parallel portion 94 and end 92.

In this configuration, the clamp handle 58 is sized and shaped to at least be partially received within the retaining slot 64 of the fin box 65. In this way, the configuration allows for the clamp handle 58 to be partially disposed within the retaining slot 64 when clamped down, thereby reducing the overall profile of the clamp handle 58 and reducing drag caused by the remainder of the clamp handle 58 that is not received within the retaining slot 64.

In some embodiments, the tapered portion 96 begins at the clamp head 56 and extends all the way to the end 92. Accordingly, no parallel portion 94 is present in such an embodiment. In embodiments with the parallel portion 94, the parallel portion 94 provides durability, strength, and rigidity to the clamp handle 58 due to its larger dimension than the tapered portion 96.

In another embodiment of the present invention, the bottom 24 of the body 16 has a notch or cutout 100 that extends towards the top of the body 16. The cutout 24 is positioned between the first end 18 and the second end 20 and is aligned with or substantially aligned with the bore 46. In this way, the bore 44 extends through the body 16 and terminates at the cutout 100.

A nut or fastener 102 is received in the cutout 100 when the clamp assembly 10 is assembled as shown in FIG. 7. The nut 102 receives the screw 50 that passes through the bore 46. In operation, this is accomplished by passing the screw 50 through the bore 46 and attaching the nut 102. Thereafter, the clamp 48 is used to tighten the screw 50 through the nut 102 and reducing the length of the screw 50 between the top 22 and the bottom 24 of the body 16. When the clamp 48 is in close tolerance with the top 22 and the nut 102 is received in the cutout 100 in close tolerances, the clamp 48 can be transitioned so that the cam shape of the clamp 48 tightens and engages the clamp 48 at the top 22 of the body 16 and the bottom 24 of the body 16 with the nut 102.

The presence of the cutout 100 retains the nut 102 so that the nut 102 does not protrude from the bottom 24 of the body 16. In some embodiments, the nut 102 has a rectangular or square shape that is substantially the same or the same as the size and shape of the cutout 100. In this way, the nut 102 cannot rotate as the nut 102 is restricted from movement by the confines of the cutout 100. This in turn, prevents the nut 102 and thereby the clamp 48 from rotating causing drag during use of the aquatic device 14.

By connecting the nut 102 to the screw 50 rather than the body 16 directly, the risk of stripping is reduced. In the event that stripping occurs, the nut 102 can be replaced. In one arrangement, the nut 102 is metallic, which further reduces the likelihood of stripping due to the durability of the metal material.

In another embodiment of the present invention, the body 16 has only the top 22. With reference to the illustrative embodiment of FIGS. 8 and 9, the top 22 has a top portion 104 and a bottom portion or protuberance 106. The top portion 104 and the protuberance 106, in some arrangements, are of a monolithic or one-piece construction. The connection between the top portion 104 and the protuberance 106 has a general T-shaped configuration.

The top portion 104 has front 108, a back 110, a first side 112, a second side 114, a top 116, and a bottom 118. A recess 120 is formed between the front 108 and the back 110 that is concave so as to accommodate the shape of the clamp head 56.

The protuberance 106 extends from the bottom 118 of the top portion 104 and is inset from the first side 112 and the second side 114. In the illustrative embodiment, the protuberance 106 extends from the front 108 to the back 110. In this way the protuberance 106 extends perpendicular to a bottom 122 of the recess 120.

Figure 9:
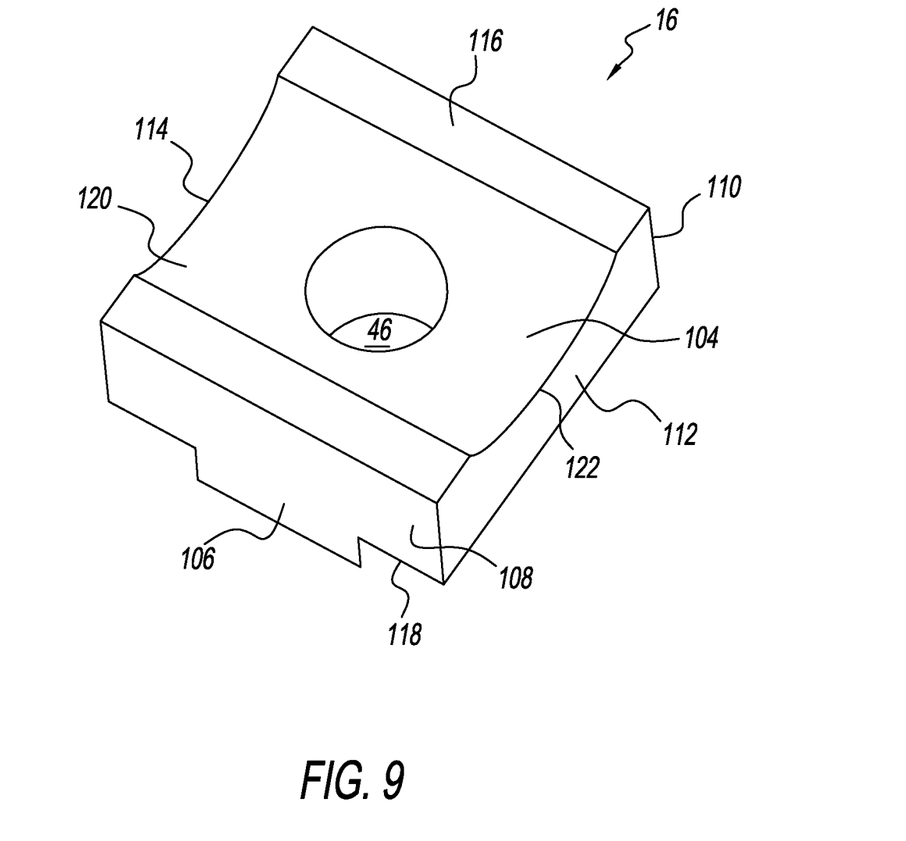
FIG. 9 is a perspective view of a body of a clamp assembly.
Figure 10:
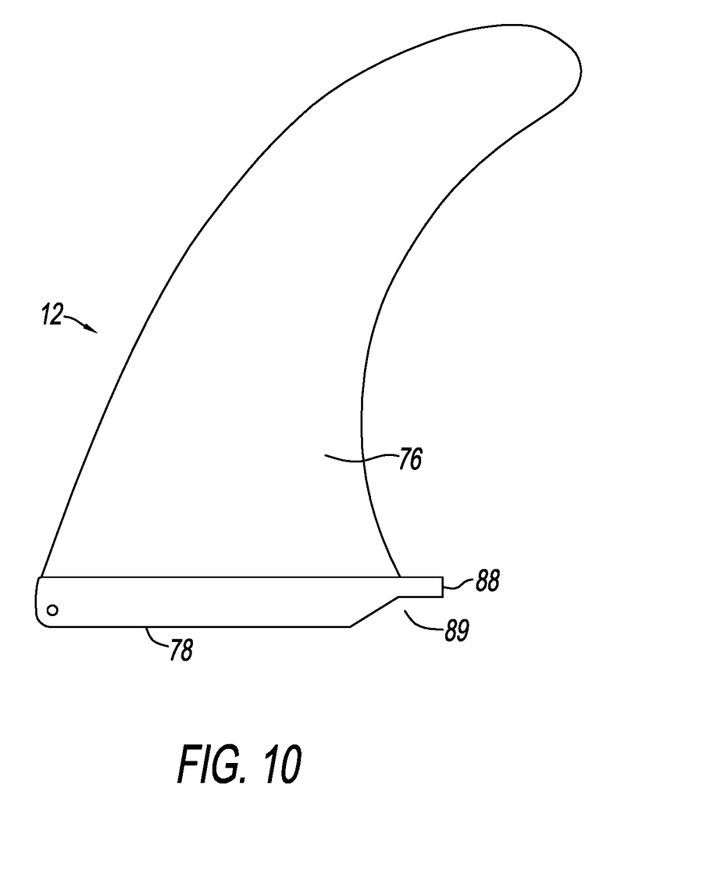
FIG. 10 is a side view of a rudder according to an aspect of the disclosure.
Figure 11:
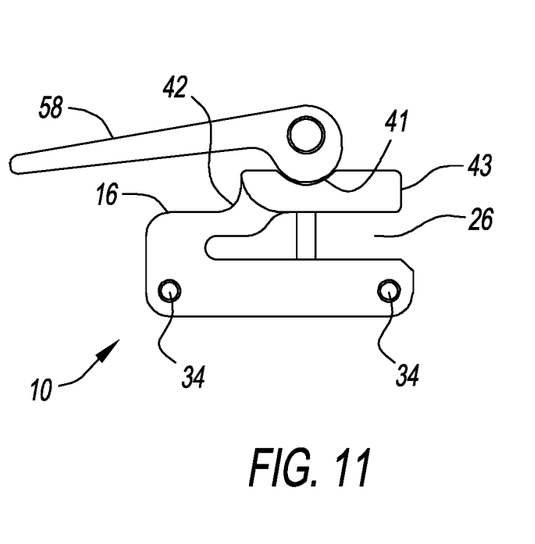
FIG. 11 is a side view of a clamping assembly.
Figure 12:
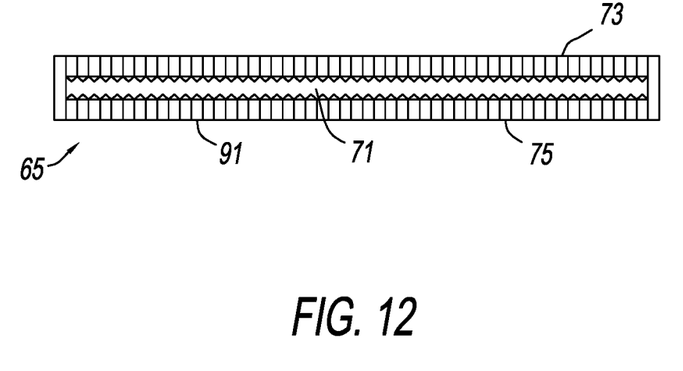
FIG. 12 is a side view of a fin box according to an aspect of the disclosure.

The protuberance 106 is sized and shaped to fit within the retaining slot 64 of the fin box 65, such as rectangular as shown in FIG. 9, and the top portion 104 is sized and shaped to not fit through the retaining slot 64 or the shorter portion 70 of the retaining slot 64. This allows the body 16 of this embodiment to slide laterally along the path formed by the retaining slot 64 with the protuberance 106 maintaining the position of the body 16 along the retaining slot 64. Simultaneously, the size of the top portion 104 prevents the body 16 from passing wholly into or through the retaining slot 64 and instead the top portion 104 slides on top of a top surface 121 of the fin box 65. Accordingly, the body 16 can be positioned anywhere along the retaining slot 64, which allows for more fine-tuned positioning of the rudder 12 at the ends of the fin box 65.

In one particular embodiment, the top portion 104 is 0.70 inches and has a square profile when viewed from above. This size fits within a ridge 124 of many fin boxes 65 and by having a square shape, the body 16 cannot rotate due to the restriction caused by the ridge 124 of the fin box 65. At smaller dimensions the top portion 104 is prone for more movement because it does not immediately engage the ridge 124 if rotated. If the top portion 121 is larger, then the top portion 121 will not fit within the ridge 124 and thereby the ridge 124 cannot inhibit movement if rotated.

The bore 44 passes through the top portion 104 and the protuberance 106, which permits the screw or post 50 to pass through while the recess 120 of the top portion 104 receives the clamp 48. As shown in FIG. 9, the screw 50 connects to a connector or nut 126. The connector 126 is configured to be sized and shaped as to allow passage into the fin box 65 through the shorter portion 70 of the retaining slot 64. Once inserted, the connector 126 is sized and shaped to fit within and allow lateral movement along the internal portion 72 of the retaining slot 64.

Therefore, a clamp assembly 10 has been provided that provides reduced drag in the water, is easy to use, has parts that are difficult to lose, limits or eliminates stripping occurring during clamping, maximizes lateral movement along a retaining slot 64 of a fin box 65, and improves upon the art.

From the above discussion and accompanying figures and claims it will be appreciated that the clamp assembly 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A clamp assembly for securing a rudder to an aquatic device, comprising:
   a body having a first end, a second end, a top, and a bottom;
   a slot in the body that extends from the first end toward the second end;
   the slot forming a bottom finger between the slot and the bottom of the body;
   at least one pin extending outwardly from and transversely across through the bottom finger of the body perpendicularly to the first end and the second end of the body; and
   a clamp having a clamp handle operatively connected to the top of the body, wherein the clamp handle is configured to transition such that a clamping force is applied by reducing a height of the slot in the body.

2. The clamp assembly of claim 1 further comprising a cutout in the bottom.

3. The clamp assembly of claim 2 further comprising a post operatively connected to the clamp at one end and connected to a nut at the other end.

4. The clamp assembly of claim 3 wherein the nut is configured to be received and fit entirely within the cutout such that when received in the cutout the movement of the nut is limited.

5. The clamp assembly of claim 1 further comprising the clamp handle having a parallel portion and a tapered portion.

6. The clamp assembly of claim 1 wherein the parallel portion extends from a clamp head to the tapered portion and the tapered portion extends from the parallel portion to an end of the clamp handle.

7. The clamp assembly of claim 1 wherein the at least one pin is configured to be received in a transverse portion of a fin box and to move along an internal portion of the fin box.

8. The clamp assembly of claim 1 wherein the at least one pin is at least two pins.

9. The clamp assembly of claim 8 wherein one pin of the at least two pins is positioned adjacent the first end of the body and another pin of the at least two pins is positioned adjacent the second end of the body.

10. A clamp assembly for securing a rudder to an aquatic device, comprising:
    a body having a first end, a second end, a top, and a bottom;
    a slot in the body that extends from the first end toward the second end;
    at least two pins extending outwardly from and transversely across through the bottom of the body perpendicularly to the first end and the second end of the body;
    wherein one pin of the at least two pins is positioned adjacent the first end of the body and another pin of the at least two pins is positioned adjacent the second end of the body; and
    a clamp having a clamp handle operatively connected to the top of the body, wherein the clamp handle is configured to transition such that a clamping force is applied by reducing a height of the slot in the body.

11. A clamp assembly for securing a rudder to an aquatic device, comprising:
    a body having a first end, a second end, a top, and a bottom;
    a cutout in the bottom of the body;
    a slot in the body that extends from the first end toward the second end;
    at least one pin extending outwardly from and transversely across the body perpendicularly to the first end and the second end of the body;

a clamp having a clamp handle operatively connected to the top of the body;
a post operatively connected to the clamp at one end and connected to a nut at the other end;
wherein the nut is configured to be received and fit entirely within the cutout such that when received in the cutout the rotational movement of the nut is blocked by the confines of the cutout;
wherein the clamp handle is configured to transition such that a clamping force is applied by reducing a height of the slot in the body.

\* \* \* \* \*